3,004,072
METHOD OF MAKING 4,4'-DI(HALOMETHYL) DIPHENYL OXIDES AND PRODUCT

James D. Doedens, Midland, and Earl H. Rosenbrock, Auburn, Mich., assignors to The Dow Chemical Company, Midland, Mich., a corporation of Delaware
No Drawing. Filed Mar. 26, 1959, Ser. No. 801,986
2 Claims. (Cl. 260—612)

This invention concerns a method for preparing 4,4'-di(halomethyl)diphenyl oxides, halo being inclusive of chloro and bromo, and the new compound 4,4'-di(bromomethyl)diphenyl oxide. Hereinafter, reference to these compounds will be as 4,4'-DHMDPO, 4,4'-DCMDPO and 4,4'-DBMDPO, respectively.

It has been reported that 4,4'-DCMDPO has been prepared by reacting proportions of 1 mole diphenyl oxide (hereinfter referred to as DPO), 2 moles formalin ($CH_2O$ basis), aqueous zinc chloride (50 weight percent, DPO basis) anhydrous HCl and HOAc as follows. The anhydrous HCl is added at a rapid rate to the reaction mixture at 98°–100° C. After about 3 hours, the reaction mixture is cooled, extracted several times with diethyl ether, the extracts are washed with water and aqueous sodium carbonate, dried over anhydrous sodium sulfate and fractionally distilled under reduced pressure, whereby 4,4'-DCMDPO is recovered. This method gives a mixture of mono- and DCMDPO and low molecular weight polymeric products. Separation of products is difficult. Several ether extractions and a distillation are utilized. Upon distillation, decomposition of the wanted DCMDPO occurs because the boiling point of DCMDPO is close to its decomposition temperature. HCl evolved on decomposition then catalyzes polymerization to tars and other polymeric residues. Also, the zinc chloride cannot be completely removed from the organic material and catalyzes its polymerization to polymeric and tarry residues The difficulties of the prior art have been overcome to a marked degree by the process of this invention wherein yields as high as about 75 percent 4,4'-DHMDPO, DPO basis, can be obtained. The process comprises reacting a mixture of proportions of 1 mole DPO to about 2–4 moles formaldehyde, advantageously as paraformaldehyde to about 3–4 moles hydrogen chloride, as concentrated hydrochloric acid. Concentrated hydrobromic acid is substituted for the hydrochloric acid when the bromomethyl analog is desired. About 10–40 percent acetic acid, advantageously as 90–100 percent HOAc, as a solvent and about 15–30 weight percent concentrated sulfuric acid as catalyst (or an equivalent amount of concentrated phosphoric acid), both acetic acid and sulfuric acid being calculated as weight percent of total reaction medium, are utilized. Preferably equal concentrations of acetic and sulfuric acids are used to give maximum yields. A reaction temperature of about 70° to 100° C. for about ¾ to about 3 hours, preferably 90°–100° C. for about ¾ to 1½ hours, is used.

The reaction product is separated from the reaction medium by cooling it to 20°–30° C to crystallize product 4,4'-DHMDPO and separating and washing the product crystals with water until the wash water is neutral. Additional crystals are recovered from the organic phase by washing it with water, drying it over anhydrous calcium sulfate and crystallizing by cooling to 20° C.

In practice, a charge of DPO, paraformaldehyde, concentrated hydrochloric or hydrobromic acid, acetic acid and sulfuric acid (or phosphoric acid) is added, the latter gradually, to a reaction vessel provided with an agitator, thermometer and reflux condenser. The mixture is heated at 90°–100° C. until reaction has proceeded to maximum yield, advantageously for ¾ to 1½ hours, and preferably for 1 hour at 90° C. The reaction mixture is then cooled to 20°–30° C. and dropped into a separatory funnel where crystals of product 4,4'-DHMDPO are separated from the aqueous phase and water washed until washings are neutral. The organic phase is then separated from the aqueous phase, water washed several times, dried over anhydrous calcium sulfate and cooled to 20° C. to crystallize out additional product. The total yield so obtained ranges between about 45 and about 75 percent, DPO basis, of a commercially satisfactory 4,4'-DHMDPO product. If a pure product is desired, recrystallization is carried out by dissolving the commercial product in toluene and precipitating with a commercial mixture of octane or by dissolving the product with heating in a commercial octane mixture and cooling to crystallization.

The procedure indicated above was utilized with results and comparisons with other procedures as given in the following tables.

EXAMPLE 1

Table I.—Chloromethylation of diphenyl oxide with sulfuric acid catalyst

| Run No. | HOHO/DPO molar | DPO, g. | HOHO, g. | Conc. HCl, g. | Grams HOAc | Wt. Percent HOAc | Grams Conc. $H_2SO_4$ | Wt. percent $H_2SO_4$ | Rxn. time, hrs. | Rxn. temp., °C. | Percent Yield |
|---|---|---|---|---|---|---|---|---|---|---|---|
| 1 | 3 | 1,700 | 900 | 3,335 | 2,500 | 23.0 | 2,450 | 22.5 | 4.5 | 85 | 31.0 |
| 2 | 3 | 340 | 180 | 667 | 500 | 23.2 | 497 | 22.8 | 1.0 | 98 | 45 |
| 3 | 3 | 340 | 180 | 667 | 500 | 23.2 | 497 | 22.8 | 0.5 | 85 | 71.5 |
| 4 | 3 | 340 | 180 | 667 | 500 | 24.2 | 373 | 18.1 | 0.5 | 85 | 67.5 |
| 5 | 3 | 340 | 180 | 667 | 500 | 25.7 | 249 | 12.8 | 0.5 | 85 | 1.9 |
| 6 | 3 | 340 | 180 | 667 | 500 | 20.5 | 730 | 30.0 | 0.5 | 85 | 42.2 |
| 7 | 3 | 340 | 180 | 667 | 500 | 25.2 | 294 | 14.8 | 0.5 | 85 | 39.8 |

EXAMPLE 2

Acetic acid content in the reaction medium was varied with the following results.

Table II

| Run No. | HCHO/DPO molar | DPO, g. | HCHO, g. | Conc. HCl, g. | HOAc, g. | Wt. percent HOAc, g. | $H_2SO_4$, g. | Wt. percent $H_2SO_4$ | Rxn. Time, hrs. | Rxn. temp., °C. | Percent Yield |
|---|---|---|---|---|---|---|---|---|---|---|---|
| 1 | 3 | 340 | 180 | 667 | 500 | 23.2 | 497 | 23.2 | 1.0 | 98 | 63 |
| 2 | 3 | 340 | 180 | 667 | 250 | 13.1 | 497 | 26.0 | 1.0 | 98 | 46 |
| 3 | 3 | 340 | 180 | 667 | None | 0 | 497 | 30.0 | 1.0 | 94 | 11 |
| 4 | 3 | 340 | 180 | 667 | 1,000 | 37.5 | 497 | 18.5 | 1.0 | 94 | 44.5 |

EXAMPLE 3

Reaction time was varied with the following results.

Table III

| Run No. | HCHO/DPO molar | DPO, g. | HCHO, g. | Conc. HCl, g. | HOAc, g. | Conc. $H_2SO_4$ | Rxn. time, hrs. | Rxn. temp., °C. | 4,4'-DCMDPO, g. | Percent yield |
|---|---|---|---|---|---|---|---|---|---|---|
| 1 | 3 | 340 | 180 | 667 | 500 | 497 | 1 | 94 | 333 | 63 |
| 2 | 3 | 340 | 180 | 667 | 500 | 497 | 2 | 94 | 203 | 38 |
| 3 | 3 | 340 | 180 | 667 | 500 | 497 | 3 | 94 | 144.5 | 26 |

EXAMPLE 4

Concentrated phosphoric acid was substituted for the sulfuric acid catalyst with the following result.

Table IV

| HCHO/DPO molar | DPO, g. | HCHO, g. | Conc. HCl, g. | Conc. $H_3PO_4$, g. | HOAc, g. | Rxn. time, hrs. | Rxn. temp., °C. | 4,4'-DCMDPO, g. | Percent yield |
|---|---|---|---|---|---|---|---|---|---|
| 3 | 340 | 180 | 667 | 497 | 500 (22.8 percent of rxn. mix.). | 4.5 | 98 | 286 | 54 |

The 4,4'-DCMDPO product recrystallized from a commercial octane hydrocarbon solvent mixture boiling between 100° and 140° C., had a molecular formula of $C_{14}H_{12}OCl_2$, a molecular weight of 267, a melting range of 62.4–63° C. (62.4° C. theoretic), and a chlorine content of 26.2 percent (26.5 percent of dichloromethyldiphenyl oxide).

EXAMPLE 5

A quantity of 510 g. diphenyl oxide (3.0 mol.), 270 g. paraformaldehyde (9.0 mol. $CH_2O$), 1630 g. aqueous 48 percent hydrobromic acid (9.6 mol.), 740 g. conc. sulfuric acid, and 750 g. acetic acid was added to a 3-liter three-necked flash equipped with a mechanical stirrer, thermometer, and reflux condenser. The reaction mixture was heated at reflux for 1 hour at 90°–95° C. with agitation. It was then cooled to 25°–30° C. and the aqueous phase was separated. The organic layer was slurried with warm water and during this time the product crystallized. The material was filtered on a Buchner funnel, washed several times with water, and air dried at room temperature for several days. A quantity of 1058 g. of crystals was recovered. The crystals were dissolved in 6250 ml. of a commercial octane mixture, B.R. 100°–140° C., by heating to 75°–80° C. The solution was allowed to cool and the resulting crystals were filtered off to give 782.3 g. of 4,4'-DBMDPO crystals, 73 percent yield. The crystals were white and acicular, melted at 94°–96° C., had a molecular weight of 356.08 and a molecular formula of $C_{14}H_{12}OBr_2$.

A substantially pure 4,4'-DBMDPO was recrystallized by dissolving one part of 4,4'-DBMDPO, as above, in 7.7 parts of a commercial octane, B.R. 100°–140° C., by heating to 60°–65° C., cooling to 20° C. and filtering off the resulting crystals. The resulting product had a melting point of 95°–96° C., and consisted of 4,4'-DBMDPO having a trace of monobromomethyl DPO, as determined by infrared analysis.

EXAMPLE 6

A quantity of 340 g. diphenyl oxide (2.0 mol.), 180 g. paraformaldehyde (6 mol.), 667 g. conc. hydrochloric acid (6.6 mol.), 497 g. sulfuric acid (22.7 percent total reaction mixture) and 500 g. acetic acid (22.8 percent total reaction mixture) was added to a reaction vessel equipped with a mechanical stirrer, thermometer, gas sparging tube, and reflux condenser. The reaction mixture was heated to 70° C. over a one hour period, then held at this temperature for 2 hours. The reaction was sparged with anhydrous HCl during the entire course of the reaction. The reacted mixture was then cooled to 50°–55° C. and the aqueous layer was separated. The organic layer was washed twice with 60° C. water, then with a 5 percent solution of sodium bicarbonate at 60° C., and finally with one more water wash. The organic layer was then cooled to 20°–25° C. to allow crystallization. A quantity of 228 g. (41 percent yield) of 4,4'-DCMDPO crystals recovered, having a melting point of 62°–65° C. In addition, 295 g. mother liquor was also recovered.

At a concentration of 10 p.p.m., 4,4'-DBMDPO was 100 percent effective in preventing growth of *Fusarium oxysporum lycopersici* when a suspension of the latter was plated in rosebengal-streptomycin agar and incubated for 64 hours in the usual way. In comparison thereto, the known chloro analog, 4,4'-DCMDPO, showed no inhibitive effect under similar test conditions.

What is claimed is:

1. A method for making a 4,4'-dihalomethyl diphenyl oxide wherein halo is a member of the group consisting of chloro and bromo, which method comprises heating a mixture of proportions of 1 mole diphenyl oxide, about 2 to about 4 moles of formaldehyde, about 2 to about 4 moles of a concentrated hydrogen halide of the group consisting of hydrochloric and hydrobromic acid, about 10 to about 40 weight percent of concentrated acetic acid, total reactants basis, and about 15 to about 30 weight percent of a concentrated mineral acid of the group consisting of sulfuric and phosphoric acid, total reactants basis, at a temperature ranging between about 70° and about 100° C. for a time ranging between about ¾ and about 3 hours, dependent upon temperature, and separating dihalomethyl diphenyl oxide product.

2. 4,4′-di(bromomethyl)diphenyl oxide, a white, crystalline material having an empiric formula of $C_{14}H_{12}OBr_2$ and a structural formula corresponding to $$(BrCH_2C_6H_4)_2O$$

wherein the bromomethyl groups are in the 4,4′-positions.

References Cited in the file of this patent

FOREIGN PATENTS 569,570     Germany _____ Feb. 4, 1933

OTHER REFERENCES

Adams et al.: Organic Reactions, volume I (1954), pages 69, 70, 72.